United States Patent
Matsushita et al.

(10) Patent No.: US 7,970,486 B2
(45) Date of Patent: Jun. 28, 2011

(54) METHOD FOR CONTROLLING SEMICONDUCTOR MANUFACTURING APPARATUS AND CONTROL SYSTEM OF SEMICONDUCTOR MANUFACTURING APPARATUS

(75) Inventors: Hiroshi Matsushita, Hiratsuka (JP); Junji Sugamoto, Oita (JP); Masafumi Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1146 days.

(21) Appl. No.: 11/714,231

(22) Filed: Mar. 6, 2007

(65) Prior Publication Data

US 2007/0225853 A1 Sep. 27, 2007

(30) Foreign Application Priority Data

Mar. 7, 2006 (JP) ................................ 2006-061633

(51) Int. Cl.
*G06F 19/00* (2011.01)
(52) U.S. Cl. ........... 700/121; 700/108; 700/109; 702/84
(58) Field of Classification Search .................... 700/95, 700/100, 108–110, 121; 438/14; 257/E21.525; 702/81–84, 183
See application file for complete search history.

(56) References Cited

U.S. PATENT DOCUMENTS

| | | | |
|---|---|---|---|
| 6,946,303 B2 * | 9/2005 | Flanner et al. ................. | 438/14 |
| 7,123,980 B2 * | 10/2006 | Funk et al. .................... | 700/121 |
| 7,477,960 B2 * | 1/2009 | Willis et al. ................... | 700/121 |
| 7,738,978 B2 * | 6/2010 | Singh et al. .................... | 700/83 |
| 2005/0187649 A1 * | 8/2005 | Funk et al. .................... | 700/121 |
| 2009/0319196 A1 * | 12/2009 | Schaller et al. ................ | 702/31 |

FOREIGN PATENT DOCUMENTS

| JP | 2005-197323 | 7/2005 |
|---|---|---|
| JP | 2005-197503 | 7/2005 |

OTHER PUBLICATIONS

Agnar Höskuldsson, "PLS Regression Methods," Journal of Chemometrics (1988), 2:211-228.

* cited by examiner

*Primary Examiner* — Albert Decady
*Assistant Examiner* — Dave Robertson
(74) *Attorney, Agent, or Firm* — Finnegan, Henderson, Farabow, Garrett & Dunner, L.L.P.

(57) ABSTRACT

A method for controlling a semiconductor manufacturing apparatus for processing wafers divided for each lot, has acquiring quality control value data group containing quality control value data of wafers in a plurality of lots previously processed, and an equipment engineering system parameter group containing equipment engineering system parameters corresponding to the wafers; creating a prediction formula of quality control value data, acquiring a first equipment engineering system parameters; inputting the first equipment engineering system parameters to the prediction formula, and performing calculation to predict first quality control value data of the wafers in the first lot; determining processing of the wafers corresponding to the first quality control value data; acquiring measured first quality control value data of the wafers in the first lot; replacing the quality control value data corresponding to the wafers in the first processed lot; updating the prediction formula.

12 Claims, 7 Drawing Sheets

+ SIDE

| EES PARAMETER | STANDARD REGRESSION COEFFICIENT |
|---|---|
| FOCUS FOLLOW-UP PERFORMANCE X | 0.235 |
| FOCUS FOLLOW-UP PERFORMANCE Y | 0.126 |
| FOCUS ORIGIN | 0.098 |

− SIDE

| EES PARAMETER | STANDARD REGRESSION COEFFICIENT |
|---|---|
| EXPOSURE ENERGY | −0.204 |
| EXPOSURE ILLUMINATION | −0.148 |
| LASER VOLTAGE | −0.098 |

METHOD FOR CONTROLLING SEMICONDUCTOR MANUFACTURING APPARATUS AND CONTROL SYSTEM OF SEMICONDUCTOR MANUFACTURING APPARATUS

CROSS-REFERENCE TO RELATED APPLICATION

This application is based upon and claims the benefit of priority from the prior Japanese Patent Application No. 2006-61633, filed on Mar. 7, 2006, the entire contents of which are incorporated herein by reference.

BACKGROUND OF THE INVENTION

1. Field of the Invention

The present invention relates to a method for controlling a semiconductor manufacturing apparatus for processing wafers, and a control system of the semiconductor manufacturing apparatus.

2. Background Art

Conventionally, various monitoring methods are applied in the semiconductor manufacturing process. Among the methods, there is a method for monitoring a so-called QC (Quality Control) value, in which method physical quantities in the course of manufacturing process are measured.

For example, a resist value and a finished dimension value are measured in a lithography process. The measurement of QC value data takes much time, and hence, when the measurement is performed to all wafers, the productivity is lowered. Therefore, for example, there is a case where QC value data of one wafer in a lot are measured as a sample, so as to be used as representative values of the lot.

Here, the QC value data in the lithography process is used, for example, for determination of whether or not the lithography process is performed again (reworked). That is, when the measured resist dimension value as the QC value data is outside a prescribed value, the pattern exposure of the lot is judged to be unsuccessful, and the lithography process is performed again.

Even in this case, however, when the dimensional abnormality occurs in a wafer whose QC value data are not measured, the abnormality of the wafer may be overlooked.

On the contrary, even when the dimensional abnormality occurs in a wafer whose QC value data are measured, the dimension of wafers whose QC value data are not measured may be normal. In this case, unnecessary rework is performed.

Therefore, there is a risk that the cost of manufacturing process is increased, or that an abnormality is caused by the unnecessary rework even in an originally normal wafer.

On the other hand, the quality of a wafer processed by the semiconductor device manufacturing apparatus is affected by various internal states of the apparatus. For example, in the lithography process, various internal states of the apparatus, such as the states of focus control and exposure light quantity in the exposure device, or the resist coating temperature, affect the final resist dimension value.

Further, the relationship between these internal states of the apparatus and the dimension is not clarified, and a variation in the internal states may appear as an unexpected variation in the dimension. However, it has been difficult to specify in which part of the apparatus a factor affecting the dimension is located.

Here, among the conventional control systems of the semiconductor manufacturing apparatus, there is a system in which process state information, as information related to states of a process, acquired in time series during a period when each process step constituting the process is performed, and inspection result information regarding an object processed in the process are inputted, and in which a process-quality model representing a relationship between the process feature quantity extracted from the process state information and the inspection result information is created (for example, see Japanese Patent Laid-Open No. 2005-197323).

The above described control system of the semiconductor manufacturing apparatus predicts the quality of an object to be processed on the basis of the created process-quality model.

However, in some control systems of the semiconductor manufacturing apparatus, for example, there is a problem that when the process feature quantity used as the base of the process-quality model is changed with the lapse of time, deviation occurs between the quality predicted by the created process-quality model and the actually measured quality.

SUMMARY OF THE INVENTION

According one aspect of the present invention, there is provided: a method for controlling a semiconductor manufacturing apparatus for processing wafers divided for each lot, comprising acquiring quality control value data group containing quality control value data of wafers in a plurality of lots previously processed by the semiconductor manufacturing apparatus, and equipment engineering system parameter group containing equipment engineering system parameters corresponding to the wafers in the plurality of lots; creating a prediction formula of quality control value data which is a PLS regression formula, by PLS regression on the basis of the quality control value data group and the equipment engineering system parameter group; acquiring a first equipment engineering system parameters corresponding to wafers in a first lot newly processed subsequently to the last processed lot; inputting the first equipment engineering system parameters to the prediction formula, and performing calculation to predict first quality control value data of the wafers in the first lot; on the basis of the predicted first quality control value data, determining processing of the wafers corresponding to the first quality control value data, the processing to be performed by the semiconductor manufacturing apparatus; acquiring measured first quality control value data of the wafers in the first lot; replacing the quality control value data corresponding to the wafers in the first processed lot in the quality control value data group, with the first quality control value data, and replacing the equipment engineering system parameters corresponding to the wafers in the first processed lot in the equipment engineering system parameter group with the first equipment engineering system parameter; updating the prediction formula by the PLS regression on the basis of the quality control value data group and the equipment engineering system parameter group, the groups being obtained by the replacement; and when there is a second lot to be processed subsequently to the first lot, acquiring second equipment engineering system parameters corresponding to wafers in the second lot, and inputting the second equipment engineering system parameters to the updated prediction formula, and performing calculation to predict second quality control value data of the wafers in the second lot.

According another aspect of the present invention, there is provided: a control system of a semiconductor manufacturing apparatus which creates a prediction formula of quality control value data, as a PLS regression formula, by PLS regression on the basis of equipment engineering system parameter group containing equipment engineering system parameters corresponding to wafers in a plurality of lots processed by the semiconductor manufacturing apparatus, and of quality control value data group containing quality control value data of the wafers in the plurality of lots measured by a measuring device, and which predicts quality control value data of wafers in a lot to be subsequently processed, comprising a data collection server into which the quality control value data group and the equipment engineering system parameter group are inputted; a database which stores the equipment engineering system parameter group and the quality control value data group, the groups being inputted into the data collection server; a prediction formula creation calculation section which creates a prediction formula of quality control value data by using the PLS regression on the basis of the equipment engineering system parameter group and the quality control value data group, the groups being stored in the database, and which inputs first equipment engineering system parameters corresponding to wafers in a first lot newly processed subsequently to the lot last processed by the semiconductor manufacturing apparatus, into the prediction formula, and predicts first quality control value data of the wafers in the first lot; and a computer which instructs the semiconductor manufacturing apparatus to process the wafers on the basis of the predicted first quality control value data, wherein the first quality control value data of the wafers in the first lot, measured by the measuring device, are inputted into the data collection server, wherein the first quality control value data are stored in the database, wherein the prediction formula creation calculation section updates the prediction formula by the PLS regression on the basis of the quality control value data group obtained by replacing the quality control value data of the wafers in the first processed lot in the quality control value data group, with the first quality control value data measured by the measuring device, and of the equipment engineering system parameter group obtained by replacing the equipment engineering system parameters corresponding to the wafers in the first processed lot in the equipment engineering system parameter group, with the first equipment engineering system parameters; wherein when there is a second lot to be processed subsequently to the first lot, second equipment engineering system parameters corresponding to wafers in the second lot are inputted into the data collection server; wherein the second equipment engineering system parameters are stored in the database; and wherein the prediction formula creation calculation section inputs the second equipment engineering system parameters into the updated prediction formula, and performs calculation to predict second quality control value data of the wafers in the second lot.

DETAILED DESCRIPTION

A control system of a semiconductor manufacturing apparatus according to an embodiment of the present invention predicts QC value data measured in a manufacturing process of a semiconductor integrated circuit, by a prediction formula using PLS (Partial Least Square) regression. The prediction is performed by building a prediction formula for predicting QC value data of one lot by using QC value data and EES (Equipment Engineering System) data of the latest lot.

The prediction formula is updated for each lot by using the EES parameters and the QC value data which are newly obtained. Further, the EES parameters used for the prediction formula are also updated for each lot. Then, the manufacturing process is controlled on the basis of the predicted QC value data.

Further, variation factors of the manufacturing apparatus are extracted on the basis of the EES parameters used for the prediction formula, and are stabilized.

It should be noted that in each of the following embodiments, a case where a lithography process is applied as a manufacturing process is explained, but the present invention can also be similarly applied to the other manufacturing processes.

In the following, embodiments to which the present invention is applied will be described with reference to the accompanying drawings.

First Embodiment

As described above, in the present embodiment, there is described a case where a resist dimension as QC value data is predicted from EES parameters of an exposure device in a lithography process, and a manufacturing process is controlled on the basis of the QC value data. For example, when the manufacturing process is a gate processing process of a transistor, the gate dimension greatly affects the characteristics of the transistor, and hence, accurate control of the gate dimension is particularly required.

Figure 1:
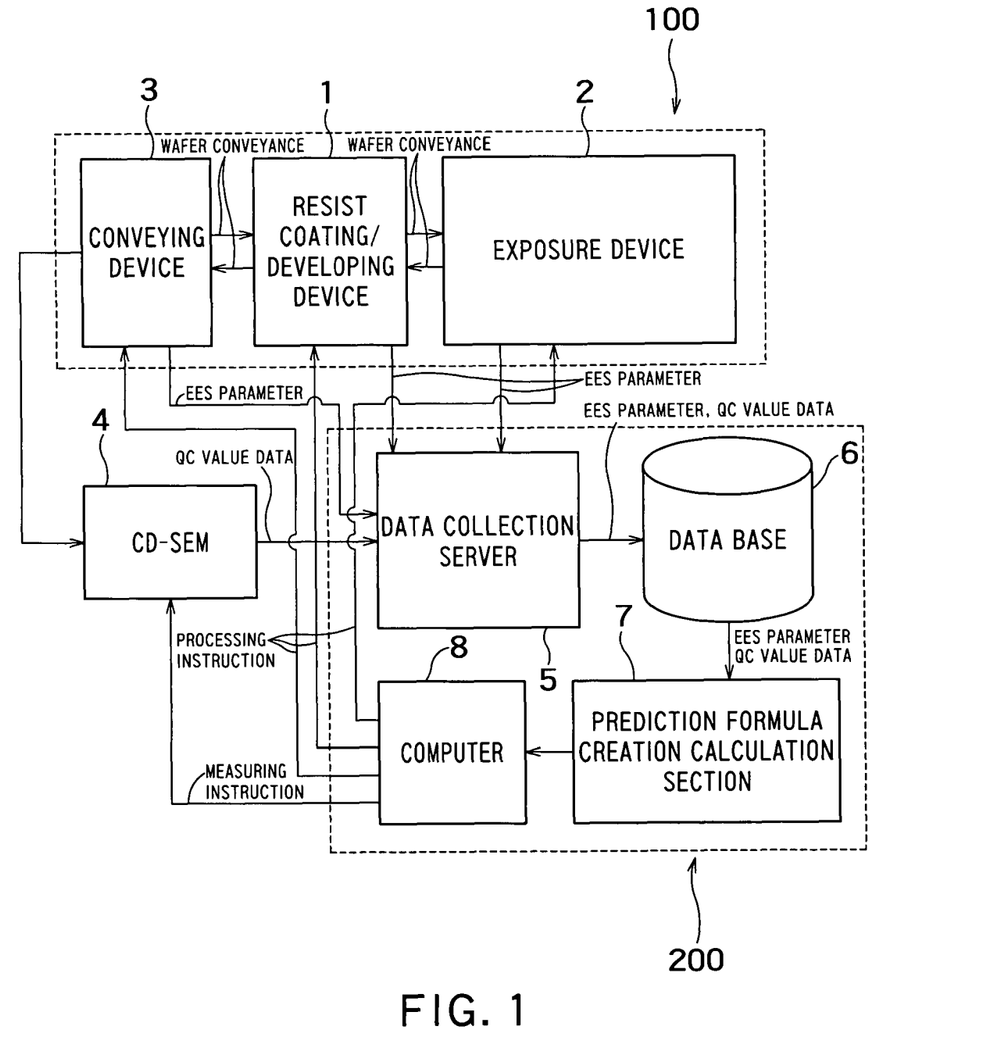
FIG. 1 is a block diagram showing a construction including a control system of a semiconductor manufacturing apparatus according to a First Embodiment of the present invention.

FIG. 1 is a block diagram showing a construction including a control system of a semiconductor manufacturing apparatus according to a First Embodiment of the present invention.

As shown in FIG. 1, a semiconductor manufacturing apparatus 100 for processing wafers divided for each lot includes a resist coating/developing device 1 which coats a resist to a wafer and develops the exposed resist, an exposure device 2 which exposes the resist coated to the wafer, and a conveying device 3 which conveys the wafer.

When each wafer is processed by the semiconductor manufacturing apparatus 100, EES parameters are acquired in each of the processing operations of the wafer which are performed in the resist coating/developing device 1, the exposure device 2, and the conveying device 3.

For example, about 300 kinds of EES parameters representing internal states of the exposure device 2 are acquired by sensors attached to the exposure device. The EES parameters include, for example, parameters related to the focus follow-up performance, the exposure light quantity, the synchronization between the wafer and the reticle, the resist coating, the laser, or the like.

Here, the EES parameters are acquired as time sequential waveform data during each processing, and are further converted to average values for each wafer. The EES parameters are acquired for all wafers in a lot.

Further, a CD-SEM (Critical Dimension Scanning Electron Microscope) 4 as a measuring device measures the dimension of the developed resist of the wafer conveyed by the conveying device 3, and outputs a resist dimension value as the QC value data.

Here, in the measurement by the CD-SEM 4, resist dimension values for the wafers in the lot are measured. In this case, the resist dimensions are measured at five places for one wafer, and converted to an average value for each wafer. The average value is used as the QC value data of this process. It should be noted that each data may also be used as it is.

Here, a control system 200 of the semiconductor manufacturing apparatus creates a prediction formula of QC value data which is a PLS regression formula, by the PLS regression on the basis of an EES parameter group containing the EES parameters corresponding to wafers in a plurality of lots processed by the semiconductor manufacturing apparatus 100, and a QC value data group containing QC value data of wafers in the plurality of lots measured by the CD-SEM 4, and predicts QC value data of a wafer in a lot to be subsequently processed.

The control system 200 of the semiconductor manufacturing apparatus includes:

a data collection server 5 to which the QC value data group and the EES parameter group are inputted; a database 6 which stores the EES parameter group and the QC value data group, which are inputted to the data collection server 5; a prediction formula creation calculation section 7 which creates a prediction formula of QC value data by using the PLS regression on the basis of the EES parameter group and QC value data group, which are stored in the database 6, and which inputs first EES parameters corresponding to newly processed wafers in a first lot next to the lot last processed by the semiconductor manufacturing apparatus 100, into the prediction formula to predict first QC value data of the wafers in the first lot; and a computer 8 which instructs the semiconductor manufacturing apparatus to process the wafers on the basis of the predicted first QC value data.

It should be noted that in the database 6, the EES parameters and the QC value data are stored so as to be associated with each other by the lot number of the processed lot and the wafer number.

Here, the reason why the PLS regression is used to create the prediction formula is explained.

For example, there is a method in which a prediction formula for predicting QC value data is obtained by using multiple regression. The multiple regression is a method by which a relational expression between a certain variable (object variable) and a plurality of variables (explanatory variable) which are considered to affect the object variable, is obtained, so as to enable the object variable to be predicted from the explanatory variables, and the degree of involvement of each explanatory variable to be evaluated at that time.

In order to obtain the prediction formula by the multiple regression, correlation analysis was performed to the QC value data and each of the EES parameters, and the EES parameters potentially affecting the resist dimension were extracted.

Figure 2:
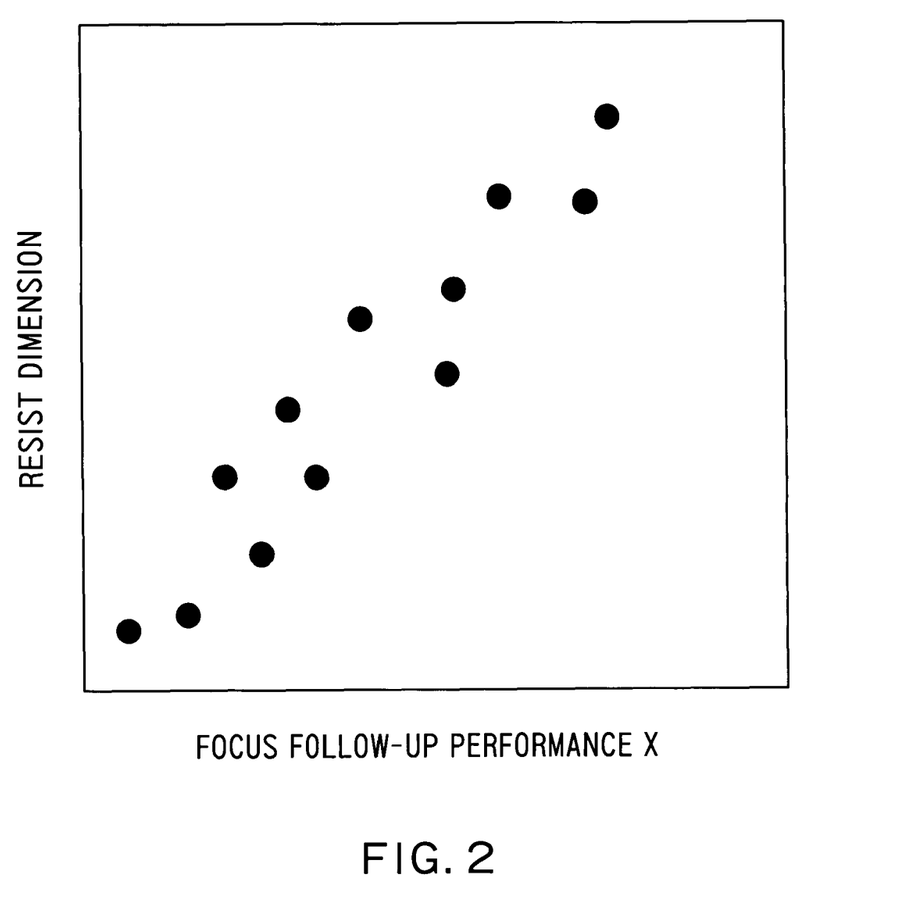
FIG. 2 is a figure showing a relationship between the "focus follow-up performance X" which is the EES parameter and the resist dimension.

For example, a case where the focus follow-up performance X is selected as the EES parameter is discussed. FIG. 2 is a figure showing a relationship between the "focus follow-up performance X" which is the EES parameter and the resist dimension.

Here, the focus follow-up performance represents an average value of the follow-up shift between an inclination angle as a control target and an actual inclination angle in the focus control at the time when the exposure device performs exposure processing while scanning the wafer stage and the reticle stage. The "focus follow-up performance X" represents a component in the X direction in the unit of $\mu$ rad.

The coefficient of correlation between the "focus follow-up performance X" and the resist dimension is 0.82. Thus, the "focus follow-up performance X" is considered to be an EES parameter affecting the resist dimension.

As a result of the above described correlation analysis, 30 EES parameters correlated with the resist dimension were extracted. Next, among the extracted EES parameters, the EES parameters linearly correlated with each other were extracted so as to be grouped. Among the grouped correlated EES parameters linearly correlated with each other, only one EES parameter was adopted. This is to prevent the accuracy of the prediction formula from being lowered due to the multicollinearity.

The multicollinearity means that when a strong linear relationship between explanatory variables exists, the multiple regression formula is not uniquely determined, and the regression accuracy is lowered. In order to prevent this, it is necessary to perform an operation by which before the multiple regression is performed, the relationship between explanatory variables is checked so as to detect explanatory variable groups, each having explanatory variables linearly related with each other, and by which the multiple regression is performed without using all the variable variables except one variable in each of the groups.

An operation to eliminate the multicollinearity was performed, and the multiple regression analysis was performed with the finally adopted EES parameters and QC measured values. Thereby, a multiple regression formula for predicting QC measured values from the EES parameters was created.

Figure 3:
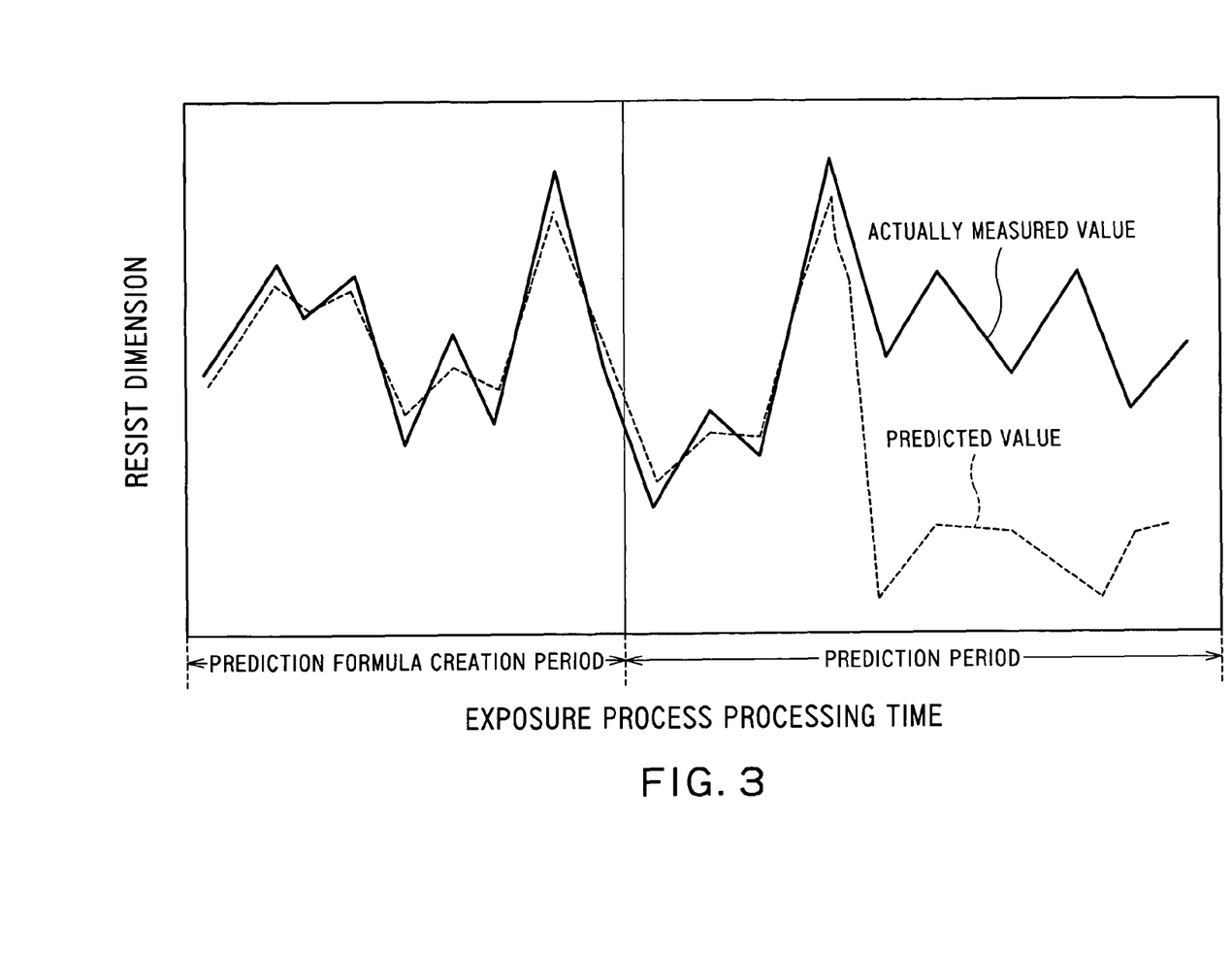
FIG. 3 is a figure showing a relationship of the exposure process processing time with resist dimensions (QC value data) predicted by the prediction formula and actually measured resist dimensions.

FIG. 3 is a figure showing a relationship of the exposure process processing time with resist dimensions (QC value data) predicted by the prediction formula and actually measured resist dimensions.

As shown in FIG. 3, the resist dimensions are almost accurately predicted in subsequent four lots by the created multiple regression formula. However, the predicted values are deviated from the measured values with the lapse of the exposure processing time. Specifically, in the tenth and subsequent lots, the predicted values and the actually measured values are quite different from each other. As a reason for the difference, it is considered that the internal state of the exposure device is changed so as to cause the created prediction formula to shift from the reality.

It can be seen from the above that it is necessary to make the prediction formula correspond to a variation of the dimensional variation factor. That is, it is necessary to provide a method for successively updating the dimension predicting model.

In the method, a prediction formula is created from data of a latest delivered lot group, and prediction on the next one lot is performed. When a next lot is further delivered, the prediction formula is updated on the basis of the latest lot group, and the prediction on the next one lot is performed. In the method, these operations are repeated.

Then, in order to automate the method, in the present embodiment, the PLS regression is used to create the prediction formula.

As described above, in the case of the multiple regression, the operation to eliminate explanatory variables which are linearly related with each other is necessary in order to avoid the multicollinearity. At this time, it is necessary to judge to what extent the variables are eliminated, for example, to what range a threshold value for the coefficients of correlation between the explanatory variables is set so as to enable variable groups having correlation coefficients exceeding the threshold value to be set as objects to be eliminated, and the like. Since arbitrary judgment of an analyst is added in setting the threshold value, there is a problem that explanatory variables originally indispensable to the prediction of explained variables are mistakenly eliminated for reasons of multicollinearity.

On the other hand, in the PLS regression, the analysis of main components of the data groups is performed, so as to create a prediction formula using the main components. The main components are orthogonal to each other, and hence, are not influenced by the multicollinearity between the data. Thereby, the acquired EES parameters need not be subjected to the check of multicollinearity by a human system, and the creation processing of the prediction formula can be automatically performed.

Here, an algorithm of the PLS regression is described in, for example, JOURNAL OF CHEMOMETRICS, VOL. 2 (PP 211 to 228) (1998), or in Japanese Patent Laid-Open No. 2005-197503. The algorithm of PLS regression is explained below.

It is assumed that the relationship between explanatory variables (here, corresponding to EES parameters) X and explained variables (here, corresponding to QC value data) Y is expressed as follows.

$$Y=BX \quad (1)$$

X and Y are vectors, each composed of a plurality of components, and B is a regression matrix (hereinafter referred to as a model) composed of coefficients of explanatory variables.

In a $X^T Y$ matrix, the i-th main component corresponding to the i-th eigenvalue is expressed by $t_i$. The matrix X is expressed by a following formula (2) by using a score $t_i$ of the i-th main component and a vector $p_i$. The matrix Y is expressed by a following formula (3) by using a score $t_i$ of the i-th main component and a vector ci.

It should be noted that in the following formula (2) and formula (3), $X_{i+1}$ and $Y_{i+1}$ denote residual matrices of X and Y, and $X^T$ denotes a transposed matrix of the matrix X. In the following, the index T means a transposed matrix.

$$X = t_1 p_1 + t_2 p_2 + t_3 p_3 + \ldots + t_i p_i + X_{i+1} \quad (2)$$

$$Y = t_1 c_1 + t_2 c_2 + t_3 c_3 + \ldots + t_i c_i + Y_{i+1} \quad (3)$$

The PLS regression used in the present embodiment is a method by which a plurality of eigenvalues and eigenvectors corresponding to the respective eigenvalues at the time of making the above described formulas correlate with each other are calculated with less calculation amount.

The PLS regression is performed by the following procedure. In the first step, the centering and scaling operations of the matrices X and Y are performed. Then, i is set as i=1, and $X_1$ and $Y_1$ are set as $X_1=X$, $Y_1=Y$.

In addition, the first column of the matrix Y1 is set as u1. The centering means an operation to subtract an average value of each row from each value of the row, and the scaling means an operation to divide each value of each row by a standard deviation of the row.

In the second step, after $w_i = X_i^T u_i/(u_i^T u_i)$ is obtained, a determinant of $w_i$ is normalized to obtain $t_i = X_i w_i$. Further, the similar processing is performed to the matrix Y to obtain $c_i = Y_i^T t_i/(t_i^T t_i)$, and thereafter the determinant of $c_i$ is normalized to obtain $u_i = Y_i c_i/(c_i^T c_i)$.

In the third step, X loading (load quantity): $p_i = X_i^T t_i/(t_i^T t_i)$ and Y loading: $qi = Y_i^T u_i/(u_i^T u_i)$ are obtained. Then, $b_i = u_i^T t_i/(t_i^T t_i)$ with u regressed to t is obtained. Subsequently, a residual matrix: $X_{i+1} = X_i - t_i p_i^T$ and a residual matrix: $Y_{i+1} = Y_i - b_i t_i c_i^T$ are obtained. Then, i is incremented to be set as i=i+1, the processing from the second step is repeated. A series of the processing is repeated until a predetermined stop condition is satisfied, or until the residual matrix: $X_{i+1}$ is converged to zero, so that the maximum eigenvalue of the residual matrix, and the eigenvector corresponding to the eigenvalue are obtained.

In the PLS regression, the residual matrix: $X_{i+1}$ is quickly converged to the stop condition or zero, and the residual matrix is quickly converged to the stop condition or zero by repeating the calculation only about ten times. Generally, the residual matrix is converged to the stop condition or zero by repeating the calculation about four to five times. The first main components of $X^T Y$ matrix are obtained by using the maximum eigenvalue and the eigenvector corresponding to the eigenvalue which are obtained by this calculation processing, so that the maximum correlation between the X matrix and the Y matrix can be known.

By performing the PLS regression in this way, a model (prediction formula) shown by formula (1) can be obtained.

On the basis of the above described study, the PLS regression was selected to create a prediction formula, for the purpose of making the prediction formula correspond to a variation of the variation factor of QC value data.

Figure 4:
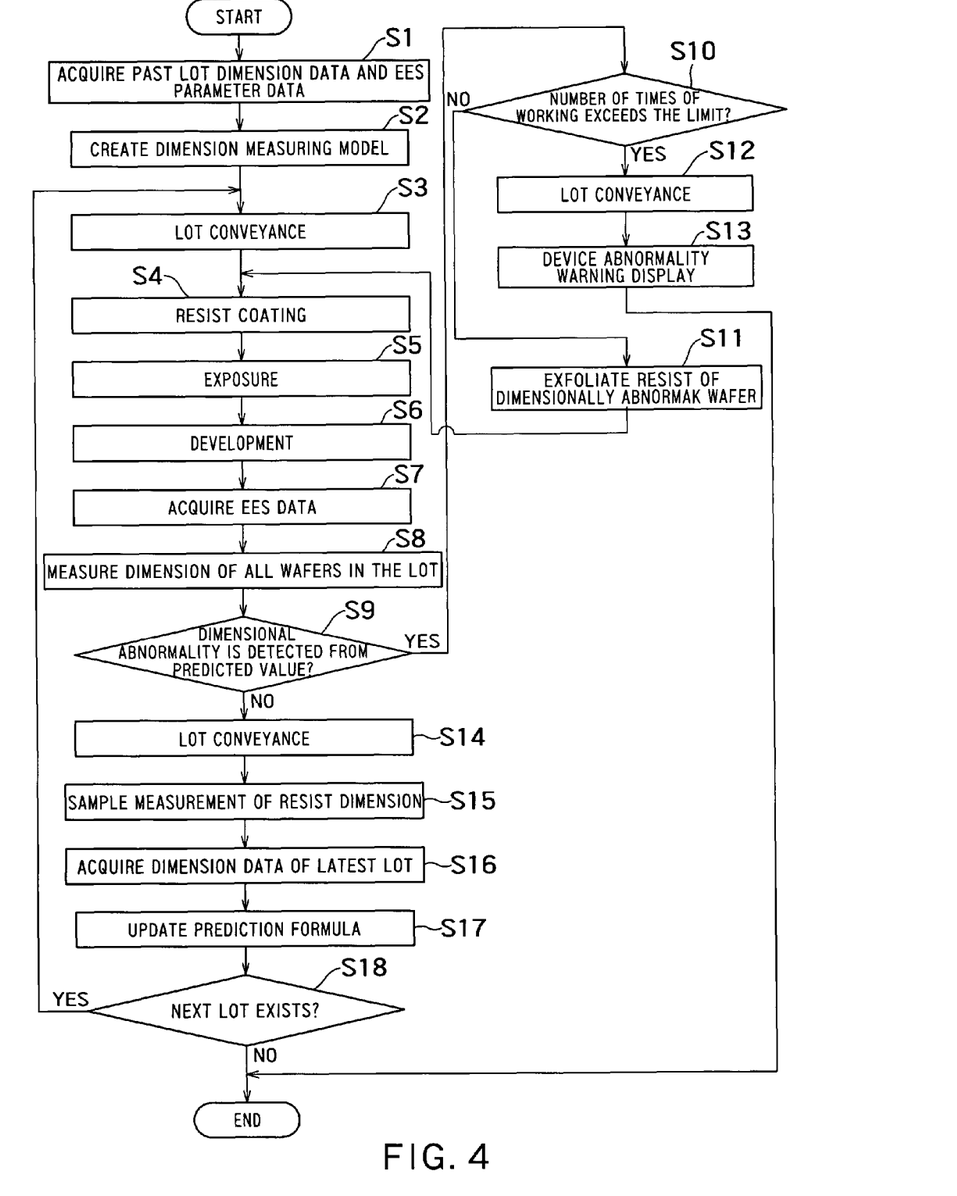
FIG. 4 is a flow chart of a method for controlling the semiconductor manufacturing apparatus according to the First Embodiment of the present invention.

Next, an operation of the semiconductor manufacturing apparatus 100 and the control system 200 which have the above described construction is explained. FIG. 4 is a flow chart of a method for controlling the semiconductor manufacturing apparatus according to the First Embodiment of the present invention.

As shown in FIG. 4, first, a QC value data group containing QC value data of wafers in a plurality of lots previously processed by the semiconductor manufacturing apparatus 100, and an EES parameter group containing EES parameters corresponding to the wafers in the plurality of lots are acquired (step S1).

That is, the QC value data group of wafers in the plurality of lots measured by the measuring device 4, and the EES parameter group outputted from the semiconductor manufacturing apparatus 100 are stored in the database 6 via the data collection server 5.

Next, the prediction formula creation calculation section 7 creates a prediction formula of QC value data, which is a PLS regression formula, by the PLS regression on the basis of the QC value data group and the EES parameter group, as described above (step S2).

Next, subsequently to the last processed lot, a first lot is newly processed and conveyed by the conveying device 3 (step S3).

Next, a resist is coated to wafers in the first lot by the resist coating/developing device 1 (step S4).

Next, the resist coated to the wafers is exposed in a desired pattern by the exposure device 2 (step S5).

Next, the exposed resist is developed by the resist coating/developing device 1 (step S6).

Next, first EES parameters corresponding to the wafers in the first lot are acquired (step S7). That is, the first EES parameters outputted from the semiconductor manufacturing apparatus 100 are stored in the database 6 via the data collection server 5. The first EES parameters include parameters corresponding to all the wafers.

Here, the first EES parameters include, for example, parameters related to the focus follow-up performance, the exposure light quantity, the synchronization between the wafer and the reticle, the resist coating, the laser, and the like, which are obtained in step 4 to step 6.

Next, the prediction formula creation calculation section 7 inputs the first EES parameters into the above described prediction formula, and performs calculation to predict first QC value data of wafers in the first lot (step S8).

Next, on the basis of the predicted first QC value data, the computer 8 determines the processing of wafers to be performed by the semiconductor manufacturing apparatus 100 corresponding to the first QC value data (step S9). That is, the computer 8 compares the resist dimension as the predicted QC value data with a prescribed value to judge whether or not the dimension is abnormal, and determines whether or not the wafer is to be reworked by the semiconductor manufacturing apparatus 100.

When the dimension is judged to be abnormal in step S9, the process proceeds to step 10.

In step S10, the computer 8 judges whether or not the number of times of reworking the wafer has exceeded the limited number of times.

When it is judged in step S10 that the number of times reworking is below the limited number of times, the process proceeds to step S11, in which the resist of the wafer whose dimension is judges to be abnormal is exfoliated. Then, the process returns to step 4, in which the resist coating process is again performed by the resist coating/developing device 1.

On the other hand, when it is judged that the number of times of reworking has exceeded the limited number of times in step S10, the process proceeds to step S12, in which after the first lot is conveyed by the conveying device 3 (step S12), the computer 8 displays a device abnormality warning to indicate that an abnormality has occurred in the semiconductor manufacturing apparatus 100, and terminates the processing by the semiconductor manufacturing apparatus 100. Then, for example, the maintenance of the semiconductor manufacturing apparatus 100 is carried out by an engineer who has recognized the device abnormality warning.

When it is judged in step S9 that there is no dimensional abnormality, the process proceeds to step S14, in which the first lot is conveyed to the CD-SEM 4 by the conveying device 3.

Next, the resist dimension which is QC value data of wafers in the conveyed first lot is measured by the CD-SEM 4 (step S15). In step S15, as described above, the measurement of the resist dimension by the CD-SEM 4 is performed to one wafer in the first lot in order to improve productivity. It should be noted that a plurality of wafers may also be measured according to the specification and conditions of the device, or the like.

Next, the measured first QC value data is stored in the database 6 via the data collection server 5 (step S16).

Next, the database 6 replaces the QC value data corresponding to the wafers in the first processed lot in the above described QC value data group with the first QC value data, and also replaces the EES parameters corresponding to the wafers in the first processed lot in the EES parameter group with the first EES parameters. Then, the prediction formula creation calculation section 7 updates the prediction formula by the PLS regression on the basis of the QC value data group and the EES parameter group which are obtained by the above described replacement (step S17).

Next, the computer 8 judges whether or not there is a second lot to be processed subsequently to the first lot, on the basis of, for example, information outputted from the conveying device 3 (step S18).

When there is the second lot to be processed subsequently to the first lot, the process returns to step S3, and proceeds to step S7 via processes from step S3 to S6. In step S7, the second EES parameters corresponding to wafers in the second lot are acquired. That is, the second EES parameters corresponding to the wafers in the second lot are inputted into the data collection server 5, so as to be stored by the database 6.

Then, the prediction formula creation calculation section 7 inputs the second EES parameters to the prediction formula updated as described above in step S8, and performs calculation to predict second QC value data of the wafers in the second lot.

In this way, QC value data are similarly predicted in the third and following lots to be processed subsequently to the second lot.

On the other hand, when there is no second lot to be processed subsequently to the first lot, that is, when there is no lot to be processed, the operation by the semiconductor manufacturing apparatus 100 and the control system 200 of the semiconductor manufacturing apparatus is ended.

Here, the prediction formula was tentatively created by the PLS regression from the EES parameter group and the QC value data group of past eight lots.

First, the main component analysis of the EES parameters for the inputted past eight lots are performed, so that a plurality of main components are extracted. Next, a regression formula for predicting QC value data of the past eight lots corresponding to the EES parameters is created from the extracted main components by using the PLS regression. A resist dimension of next one lot is predicted by the created prediction formula.

This operation was able to be automatically performed by using all the acquired EES parameters without checking the multicollinearity. The QC value data of only one wafer in one lot was measured, but the resist dimension of all wafers in the lot was able to be predicted by the prediction formula created in the present embodiment.

Figure 5:
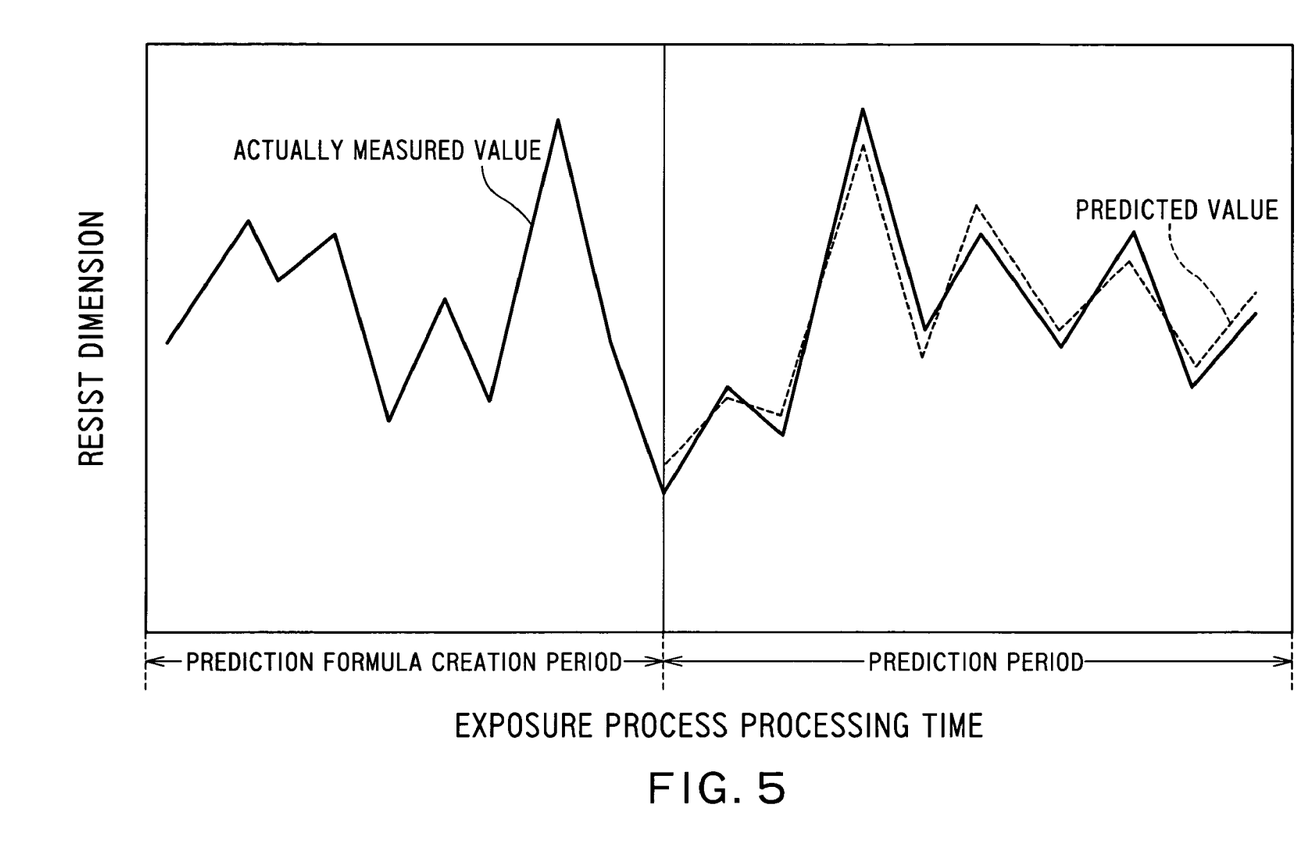
FIG. 5 is a figure showing a relationship of the exposure process processing time with the resist dimension (QC value data) predicted by the prediction formula using the PLS regression and the actually measured resist dimension.

FIG. 5 is a figure showing a relationship of the exposure process processing time with the resist dimension (QC value data) predicted by the prediction formula using the PLS regression and the actually measured resist dimension.

As shown in FIG. 5, it can be seen that the actually measured values and the predicted values substantially coincide with each other over the whole period to be predicted. This effect is considered to be obtained because the prediction formula is updated corresponding to the change of internal states of the device. It should be noted that the measurement of QC value data is performed to only a part of wafers from the viewpoint of measuring time and productivity.

By the method for controlling the semiconductor manufacturing apparatus of the present embodiment, resist dimension values as the QC value data of all wafers in a lot can be instantaneously predicted by using the EES parameters representing internal states of the device.

Conventionally, for example, the dimensional abnormality was detected on the basis of resist dimension values as the QC value data obtained by measuring a part of wafers, so as to judge whether or not the rework is to be performed. When an abnormality was found in the QC value data measured for one wafer, all the wafers of the lot had to be reworked.

However, by applying the method for controlling the semiconductor manufacturing apparatus according to the present embodiment, it is possible to individually predict a dimensionally abnormal wafer. This allows only a wafer which is predicted to be dimensionally abnormal to be passed to the reworking process. Further, dimension values of all wafers in a lot can be known, thereby making it possible to prevent the occurrence of dimensional abnormality from being overlooked.

Further, it is also possible to accurately control the final finish dimension by changing the processing amount in the subsequent etching process on the basis of the resist dimension values measured in the lithography process.

Conventionally, for example, the processing amount in the etching process of the whole lot is determined on the basis of the QC value data of a part of the wafers.

However, the resist dimension value of all the wafers can be predicted by applying the method for controlling the semiconductor manufacturing apparatus according to the present embodiment, whereby more highly accurate finished dimensions can be obtained by controlling the processing amount for each wafer in the etching process.

As described above, in the method for controlling the semiconductor manufacturing apparatus and the control system of the semiconductor manufacturing apparatus, according to the present embodiment, it is possible to highly accurately predict the QC value data of wafers corresponding to the change of internal states of the apparatus, by updating, for each lot, the prediction formula which predicts the QC value data from the EES parameters of the latest lot.

Second Embodiment

In the First Embodiment, a construction is described in which a prediction formula is created by the PLS regression using the QC value data group and EES parameter group of lots which are previously processed, and in which the EES parameters of the lot to be newly processed are inputted into the prediction formula to predict the QC value data of the lot. However, in the present embodiment, there is described a construction in which factors significantly varying the QC value data are specified by using the prediction formula.

First, there is described a concept for enabling factors (EES parameters) significantly varying the QC value data to be specified from the prediction formula obtained by the PLS regression.

Here, regression coefficients are obtained for the prediction formula which is based on the PLS regression and obtained in the First Embodiment. It is assumed that a relationship between explanatory variables x1, x2, ... xn and an explained variable y is given by the following formula.

$$y = a1x1 + a2x2 + \ldots anxn \quad (4)$$

Generally, it is considered that as regression coefficients ai (i=1, 2, ... n) become larger, variables $X_i$ make more contribution to the predicted value y.

However, since the units of the respective variables are different from each other, the values of regression coefficients cannot be compared as they are. For example, if the contribution of each variable to the predicted value is the same, the contribution of a regression coefficient of a variable in mm is different from the contribution of a regression coefficient of a variable in cm by 10 times.

Therefore, the average value and the standard deviation of each variable are normalized to 0 and 1, respectively, and regression coefficients are obtained by performing the PLS regression.

The regression coefficient obtained in this way is referred to as a standard regression coefficient. It is considered to be possible to correctly obtain the magnitude of contribution of each variable to the predicted value by comparing the magnitude of the standard regression coefficients.

Next, there is described a flow for obtaining the contribution of each EES parameter to a QC measured value by using the standard regression coefficient, on the basis of a method for controlling a semiconductor manufacturing apparatus according to the present embodiment.

Figure 6:
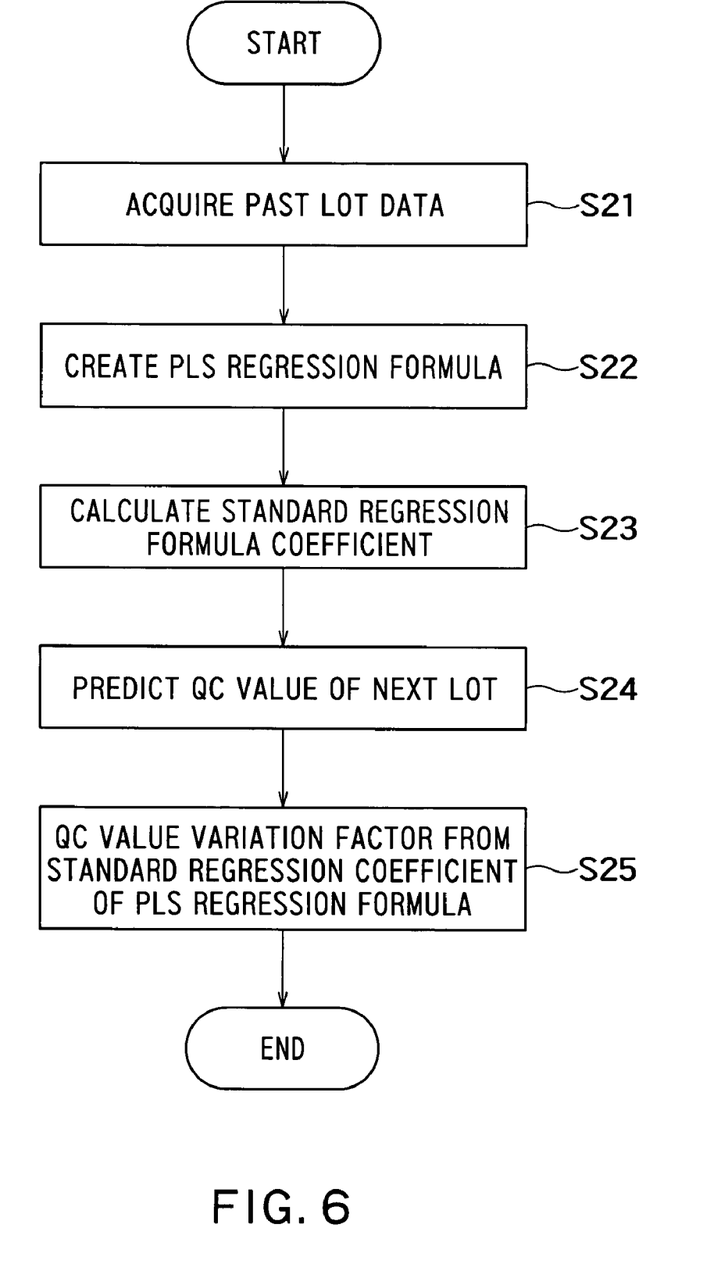
FIG. 6 is a flow chart of the method for controlling the semiconductor manufacturing apparatus according to the present Second Embodiment.

FIG. 6 is a flow chart of the method for controlling the semiconductor manufacturing apparatus according to the present Second Embodiment. It should be noted that the method for controlling the semiconductor manufacturing apparatus according to the present Second Embodiment is implemented by the control system of the semiconductor manufacturing apparatus which is the same as that of the First Embodiment.

As shown in FIG. 6, first, similarly to the First Embodiment, QC value data group containing QC value data of wafers in a plurality of lots previously processed by the semiconductor manufacturing apparatus 100, and EES parameter group containing EES parameters corresponding to the wafers in the plurality of lots are acquired (step S21).

That is, the QC value data group of the wafers in the plurality of lots, measured by the measuring device 4, and the EES parameter group outputted from the semiconductor manufacturing apparatus 100 are stored in the database 6 via the data collection server 5.

Next, the prediction formula creation calculation section 7 creates a prediction formula of QC value data as a PLS regression formula by the PLS regression, on the basis of the QC value data group and the EES parameter group (step S22).

Next, the prediction formula creation calculation section 7 normalizes the average value and the standard deviation of each regression coefficient as a variable of the obtained prediction formula to 0 and 1, respectively, and thereby calculates the standard regression coefficients (step S23).

Next, similarly to the First Embodiment, the prediction formula creation calculation section 7 inputs newly acquired EES parameters to the prediction formula, and performs calculation to predict QC value data of wafers in a newly processed lot (step S24).

Next, the prediction formula creation calculation section 7 compares the magnitude of absolute values of the respective standard regression coefficients obtained in step S23, respectively, and extracts EES parameters greatly affecting the QC value data to be predicted (step S25). Here, for example, the computer 8 specifies a construction to be managed in the semiconductor manufacturing apparatus 100, on the basis of the extracted EES parameters. Further, the computer 8 may also be arranged to automatically manage the semiconductor manufacturing apparatus 100 on the basis of the extracted EES parameters.

On the basis of the above flow, the method for controlling the semiconductor manufacturing apparatus according to the present embodiment is completed. It should be noted that when lots are continuously processed, the prediction formula may be updated in the above described step S22 similarly to the First Embodiment (the processes from step S15 to step S18), so as to allow the subsequent flow from step S23 to step S25 to be repeated.

Figure 7:
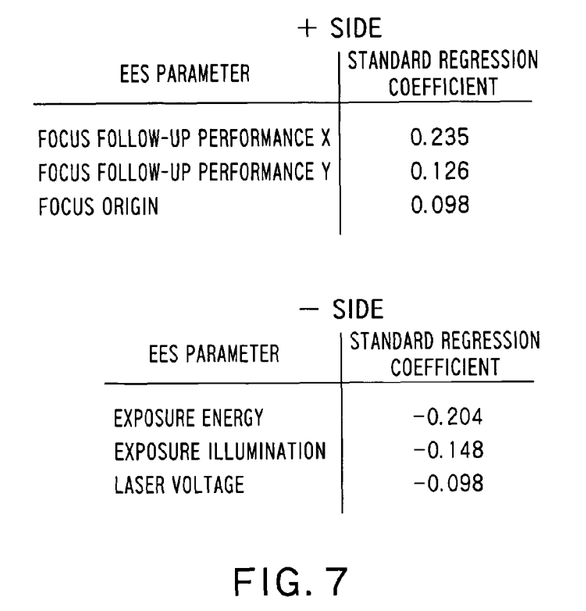
FIG. 7 is a figure showing an example of an output result of the standard regression coefficients with respect to the EES parameters of the exposure device.

FIG. 7 is a figure showing an example of an output result of the standard regression coefficients with respect to the EES parameters of the exposure device.

In FIG. 7, the standard regression coefficients are rearranged and shown in the order of absolute value. The figure shows that a standard regression coefficient having a larger absolute value makes a larger contribution to the resist dimension value as the QC value data. The EES parameter having a large absolute value on the plus side makes a positive contribution to the resist dimension value, and the EES parameter having a large absolute value on the negative side makes a negative contribution to the resist dimension value. It is possible to specify a construction of the exposure device greatly affecting the resist dimension value, by specifying an EES parameter having a large absolute value of standard regression coefficient on the positive side and the negative side.

From the EES parameters shown in FIG. 7, it can be seen that the exposure energy is a large variation factor on the negative side, and the focus follow-up performance X is a large variation factor on the positive side.

Figure 8:
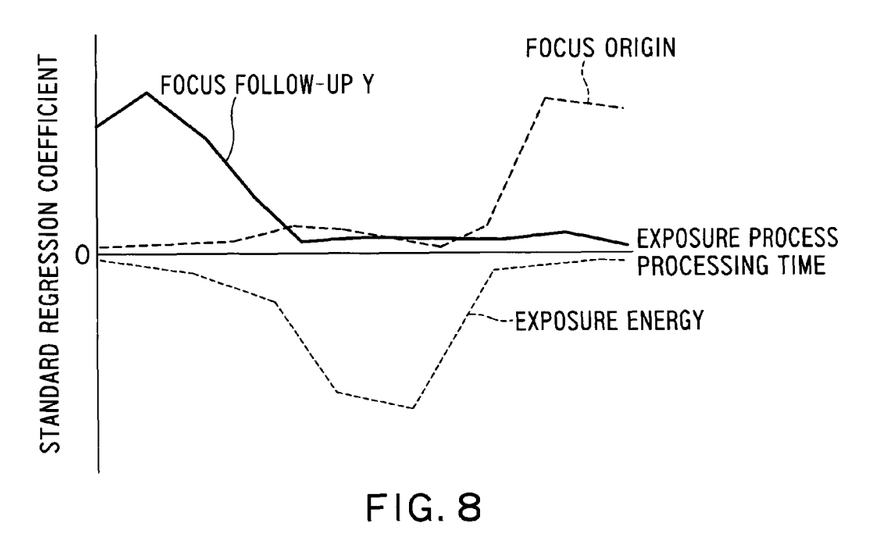
FIG. 8 is a figure showing a result obtained by plotting time series change of the standard regression coefficient of each EES parameter, while updating the prediction formula.

Here, FIG. 8 is a figure showing a result obtained by plotting time series change of the standard regression coefficient of each EES parameter, while updating the prediction formula.

As shown in FIG. 8, it can be seen that the variation factors of the resist dimension are changed with the lapse of processing time of the exposure process. For example, it is possible for an engineer who looks at this result, to concentrate on a specific construction during the work for stabilizing the exposure device.

It should be noted that the method for controlling the semiconductor manufacturing apparatus according to the present embodiment is similarly applicable to other apparatuses and manufacturing processes.

As described above, in the method for controlling the semiconductor manufacturing apparatus and the control system of the semiconductor manufacturing apparatus, according to the present embodiment, the standard regression coefficients of the EES parameters of the prediction formula are obtained, whereby variation factors greatly affecting the QC value data are automatically extracted so as to enable the work for stabilizing the apparatus to be efficiently performed.

What is claimed is:

1. A method for controlling a semiconductor manufacturing apparatus for processing wafers divided for each lot, comprising:
    acquiring quality control value data group containing quality control value data of wafers in a plurality of lots previously processed by the semiconductor manufacturing apparatus, and equipment engineering system parameter group containing equipment engineering system parameters corresponding to the wafers in the plurality of lots;
    creating a prediction formula of quality control value data which is a Partial Least Squares (PLS) regression formula, by PLS regression on the basis of the quality control value data group and the equipment engineering system parameter group;
    acquiring first equipment engineering system parameters corresponding to wafers in a first lot newly processed subsequently to the last processed lot;
    inputting the first equipment engineering system parameters to the prediction formula, and performing calculation to predict first quality control value data of the wafers in the first lot;
    on the basis of the predicted first quality control value data, determining processing of the wafers corresponding to the first quality control value data, the processing to be performed by the semiconductor manufacturing apparatus;
    acquiring measured first quality control value data of the wafers in the first lot;
    replacing the quality control value data corresponding to the wafers in the first processed lot in the quality control value data group, with the first quality control value data, and replacing the equipment engineering system parameters corresponding to the wafers in the first processed lot in the equipment engineering system parameter group with the first equipment engineering system parameter;
    updating the prediction formula by the PLS regression on the basis of the quality control value data group and the equipment engineering system parameter group, the groups being obtained by the replacement; and
    when there is a second lot to be processed subsequently to the first lot, acquiring second equipment engineering system parameters corresponding to wafers in the second lot, and inputting the second equipment engineering system parameters to the updated prediction formula, and performing calculation to predict second quality control value data of the wafers in the second lot.

2. The method for controlling a semiconductor manufacturing apparatus according to claim 1, wherein the method further comprises extracting the equipment engineering system parameters affecting the quality control value data to be predicted, by comparison of the magnitude of absolute values of respective standard regression coefficients obtained in a manner that the average value and the standard deviation of each regression coefficient which is a variable of the prediction formula are normalized to 0 and 1, respectively.

3. The method for controlling a semiconductor manufacturing apparatus according to claim 2, wherein the method further comprises deciding a construction to be managed in the semiconductor manufacturing apparatus, on the basis of the extracted equipment engineering system parameters.

4. The method for controlling a semiconductor manufacturing apparatus according to claim 2, wherein the method further comprises managing the semiconductor manufacturing apparatus on the basis of the extracted equipment engineering system parameters.

5. The method for controlling a semiconductor manufacturing apparatus according to claim 1, wherein the method further comprises comparing the predicted first quality control value data with a prescribed value, to decide whether or not the wafer corresponding to the first quality control value data should undergo a reworking by the semiconductor manufacturing apparatus.

6. The control system of the semiconductor manufacturing apparatus according to claim 5, wherein the method further comprises terminating the processing by the semiconductor manufacturing apparatus, as the semiconductor manufacturing apparatus is abnormal, when it is decided that the wafer should undergo a reworking by the semiconductor manufacturing apparatus, and when the number of times of reworking exceeds a limited number of times.

7. A control system of a semiconductor manufacturing apparatus which creates a prediction formula of quality control value data, as a Partial Least Squares (PLS) regression formula, by PLS regression on the basis of equipment engineering system parameter group containing equipment engineering system parameters corresponding to wafers in a plurality of lots processed by the semiconductor manufacturing apparatus, and of quality control value data group containing quality control value data of the wafers in the plurality of lots measured by a measuring device, and which predicts quality control value data of wafers in a lot to be subsequently processed, comprising:

a data collection server into which the quality control value data group and the equipment engineering system parameter group are inputted;

a database which stores the equipment engineering system parameter group and the quality control value data group, the groups being inputted into the data collection server;

a prediction formula creation calculation section which creates a prediction formula of quality control value data by using the PLS regression on the basis of the equipment engineering system parameter group and the quality control value data group, the groups being stored in the database, and which inputs first equipment engineering system parameters corresponding to wafers in a first lot newly processed subsequently to the lot last processed by the semiconductor manufacturing apparatus, into the prediction formula, and predicts first quality control value data of the wafers in the first lot; and a computer which instructs the semiconductor manufacturing apparatus to process the wafers on the basis of the predicted first quality control value data, wherein the first quality control value data of the wafers in the first lot, measured by the measuring device, are inputted into the data collection server, wherein the first quality control value data are stored in the database, wherein the prediction formula creation calculation section updates the prediction formula by the PLS regression on the basis of the quality control value data group obtained by replacing the quality control value data of the wafers in the first processed lot in the quality control value data group, with the first quality control value data measured by the measuring device, and of the equipment engineering system parameter group obtained by replacing the equipment engineering system parameters corresponding to the wafers in the first processed lot in the equipment engineering system parameter group, with the first equipment engineering system parameters;

wherein when there is a second lot to be processed subsequently to the first lot, second equipment engineering system parameters corresponding to wafers in the second lot are inputted into the data collection server;

wherein the second equipment engineering system parameters are stored in the database; and wherein the prediction formula creation calculation section inputs the second equipment engineering system parameters into the updated prediction formula, and performs calculation to predict second quality control value data of the wafers in the second lot.

8. The control system of the semiconductor manufacturing apparatus according to claim 7, wherein the prediction formula creation calculation section extracts the equipment engineering system parameters affecting the quality control value data to be predicted, by comparison of the magnitude of absolute values of respective standard regression coefficients obtained in a manner that the average value and the standard deviation of each regression coefficient which is a variable of the prediction formula are normalized to 0 and 1, respectively.

9. The control system of the semiconductor manufacturing apparatus according to claim 8, wherein the computer decides a construction to be managed in the semiconductor manufacturing apparatus, on the basis of the extracted equipment engineering system parameters.

10. The control system of the semiconductor manufacturing apparatus according to claim 8, wherein the computer manages the semiconductor manufacturing apparatus on the basis of the extracted equipment engineering system parameters.

11. The control system of the semiconductor manufacturing apparatus according to claim 7, wherein the computer compares the predicted first quality control value data with a prescribed value, to decide whether or not the wafer corresponding to the first quality control value data should undergo a reworking by the semiconductor manufacturing apparatus.

12. The control system of the semiconductor manufacturing apparatus according to claim 11, wherein when the computer decides that the wafer should undergo a reworking by the semiconductor manufacturing apparatus, and when the number of times of reworking exceeds a limited number of times, the computer terminates the processing by the semiconductor manufacturing apparatus, as the semiconductor manufacturing apparatus is abnormal.

* * * * *